United States Patent
Shon et al.

(10) Patent No.: US 11,664,015 B2
(45) Date of Patent: May 30, 2023

(54) METHOD FOR SEARCHING FOR CONTENTS HAVING SAME VOICE AS VOICE OF TARGET SPEAKER, AND APPARATUS FOR EXECUTING SAME

(71) Applicant: NEOSAPIENCE, INC., Seoul (KR)

(72) Inventors: Suwon Shon, Seoul (KR); Younggun Lee, Seoul (KR); Taesu Kim, Suwon-si (KR)

(73) Assignee: NEOSAPIENCE, INC., Seoul (KR)

(*) Notice: Subject to any disclaimer, the term of this patent is extended or adjusted under 35 U.S.C. 154(b) by 273 days.

(21) Appl. No.: 17/319,566

(22) Filed: May 13, 2021

(65) Prior Publication Data

US 2021/0280173 A1 Sep. 9, 2021

Related U.S. Application Data

(63) Continuation of application No. PCT/KR2019/015589, filed on Nov. 14, 2019.

(30) Foreign Application Priority Data

| Nov. 14, 2018 | (KR) | 10-2018-0139831 |
| Nov. 22, 2018 | (KR) | 10-2018-0145732 |
| Nov. 14, 2019 | (KR) | 10-2019-0146098 |

(51) Int. Cl.
*G10L 15/10* (2006.01)
*G06F 16/901* (2019.01)
(Continued)

(52) U.S. Cl.
CPC ............ *G10L 15/10* (2013.01); *G06F 16/683* (2019.01); *G06F 16/9014* (2019.01); *G06N 3/04* (2013.01); *G10L 15/02* (2013.01); *G10L 25/03* (2013.01)

(58) Field of Classification Search
CPC ...... G10L 15/10; G10L 15/02; G06F 16/9014
See application file for complete search history.

(56) References Cited

U.S. PATENT DOCUMENTS

| 2014/0135964 A1* | 5/2014 | Eom ................ G06F 16/683 700/94 |
| 2015/0127342 A1* | 5/2015 | Sharifi ............... G10L 17/18 704/239 |

FOREIGN PATENT DOCUMENTS

| CN | 105741853 A | 7/2016 |
| CN | 107610706 A | 1/2018 |

(Continued)

OTHER PUBLICATIONS

International Search Report of PCT/KR2019/015589 dated Feb. 24, 2020.

(Continued)

*Primary Examiner* — Thomas H Maung
(74) *Attorney, Agent, or Firm* — Dinsmore & Shohl LLP; Yongsok Choi, Esq.

(57) ABSTRACT

A method for searching content having same voice as a voice of a target speaker from among a plurality of contents includes extracting a feature vector corresponding to the voice of the target speaker, selecting any subset of speakers from a training dataset repeatedly by a predetermined number of times, generating linear discriminant analysis (LDA) transformation matrices using each of the selected any subsets of speakers repeatedly by a predetermined number of times, projecting the extracted speaker feature vector to the selected corresponding subsets of speakers using each of the generated LDA transformation matrices, assigning a value corresponding to nearby speaker class among corresponding subsets of speakers, to each of projection regions of the extracted speaker feature vector, generating a hash value corresponding to the extracted feature vector based on (Continued)

the assigned values, and searching content having a similar hash value to the generated hash value among the contents.

9 Claims, 12 Drawing Sheets

(51) Int. Cl.
*G06F 16/683* (2019.01)
*G06N 3/04* (2023.01)
*G10L 15/02* (2006.01)
*G10L 25/03* (2013.01)

(56) References Cited

FOREIGN PATENT DOCUMENTS

| | | |
|---|---|---|
| EP | 2731030 A1 | 5/2014 |
| KR | 1020070093576 A | 9/2007 |
| KR | 1020110027362 A | 3/2011 |
| KR | 101376478 B1 | 3/2014 |
| WO | 2016122016 A1 | 8/2016 |

OTHER PUBLICATIONS

Myung-Jae Kim, "How does Kakao Mini recognize voices?", Magazine—Kakao AI Report, vol. 7, No. 2, Oct. 31, 2017.

* cited by examiner

RELATIVE SPEED-UP TO LINEAR SEARCH (TIMES)
GRAPH FOR SPEAKER IDENTIFICATION TASK

METHOD FOR SEARCHING FOR CONTENTS HAVING SAME VOICE AS VOICE OF TARGET SPEAKER, AND APPARATUS FOR EXECUTING SAME

CROSS-REFERENCE TO RELATED APPLICATIONS

The present application is a continuation of International Patent Application No. PCT/KR2019/015589, filed Nov. 14, 2019, which is based upon and claims the benefit of priorities to Korean Patent Application No. 10-2018-0139831, filed on Nov. 14, 2018, Korean Patent Application No. 10-2018-0145732, filed on Nov. 22, 2018, and Korean Patent Application No. 10-2019-0146098, filed on Nov. 14, 2019. The disclosures of the above-listed applications are hereby incorporated by reference herein in their entirety.

TECHNICAL FIELD

The present disclosure relates to a method and a system for searching content including same or similar voice to a voice of a target speaker. More specifically, the present disclosure relates to a method and a system for extracting a feature representing a voice of a target speaker, calculating a hash value corresponding to the extracted feature using a hash function, and searching content associated with a similar hash value to the calculated hash value.

BACKGROUND ART

Recently, users of electronic devices such as smartphones, computers, and the like who use the Internet can easily access newly-generated real-time data such as a wide range of video clips, audio clips, social media, and the like from various countries on a network. For example, hundreds to tens of thousands of hours of videos are uploaded to a specific video site every minute, and hundreds of millions to billions of users are watching the uploaded videos. These online videos may include contents including speeches generated by the voices of speakers.

In addition, the speech synthesis technology (Text-To-Speech technology), which is a technology that reproduces the voice that needs to be played without requiring pre-recorded human voice, has recently been in the spotlight for the services or applications that require human voices, such as announcements, navigation, artificial intelligence assistants, audio books, video production, and the like. In particular, with the recent rapid development of deep learning-based speech synthesis technology, a precisely synthesized voice for a specific person (e.g., a celebrity) can be generated as if the speech or voice of the specific person was actually recorded, and it may be difficult to distinguish whether the voice of the specific person was actually recorded or synthesized.

However, in such an environment, various contents may be produced by using the voice of a specific person extracted without permission of the specific person, or using the synthetic voice of the specific person generated through speech synthesis technology. Accordingly, there is a possibility of use or misuse of a voice of a specific person, and there is a concern that such a synthesized or duplicated voice may be used contrary to the intention of the specific person or used for crime. In order to find out and further prevent use of a voice of a specific person without the specific person's permission, there is a need for a system capable of searching content in which the person's own voice or speech is used.

Meanwhile, in the related multimedia search technology environment, a platform that enables music search or video search is provided. However, under such a platform, while it is possible to search a specific music or video content, the user of such a platform cannot search content that includes a voice of a specific person based on the voice, that is, the voice feature, of the specific person. That is, it is not possible to search content that includes different contents generated by the voice of a same speaker not based on the contents of the content, but based on the voice features of the speaker. In particular, it is practically difficult to search the voice itself in such a search space (e.g., a network) where a wide range of voices are present. Accordingly, there is a need for a technology to quickly and accurately search a voice of a specific person on a wide range of voice data online.

SUMMARY

Technical Problem

A method and a system according to the present disclosure may generate a hash value corresponding to a feature representing a voice of a speaker, and search content that includes same voice as the voice of the speaker from among a plurality of contents searchable on the network, by using the generated hash value.

In addition, the method and the system according to the present disclosure may extract a speaker feature vector representing a feature of a voice for a specific person, calculate a hash value by projecting the extracted speaker feature vector to a random speaker variance subspace using a hash function, and search content associated with a similar hash value to the calculated hash value.

In addition, the method and the system according to the present disclosure may use pre-trained voice data that is configured to classify voices of a plurality of specific speakers, when extracting a random subset of speakers for use in generate the hash value corresponding to the speaker feature vector representing the feature of the specific speaker.

Technical Solution

The present disclosure may be implemented in various ways, including a computer readable storage medium that stores a method, a system, an apparatus, a computer program, or instructions.

According to an embodiment of the present disclosure, a method for searching content including a same voice as a voice of a target speaker is provided, which may include receiving a sound generated by the voice of the target speaker, extracting a feature representing the voice of the target speaker from the sound, calculating a hash value corresponding to the feature representing the voice of the target speaker using a hash function, and searching content associated with a similar hash value to the calculated hash value from among a plurality of contents searchable on a network.

According to an embodiment of the present disclosure, the extracting the feature representing the voice of the target speaker from the sound may include extracting a speaker feature vector corresponding to the voice of the target speaker from the sound.

According to an embodiment of the present disclosure, the calculating the hash value corresponding to the feature representing the voice of the target speaker using the hash function may include selecting a random subset of speakers from training voice data repeatedly by a predetermined number of times, in which the random subset of speakers may be associated with a plurality of speaker classes, generating a discriminative transform function based on the selected subset of the random speakers, in which the hash function may be generated using the generated discriminative transform function, and inputting the extracted speaker feature vector into the hash function and calculating a hash value corresponding to the feature representing the voice of the target speaker.

According to an embodiment of the present disclosure, the generating the discriminative transform function based on the selected random subset of speakers may include training an artificial neural network discrimination model using the selected random subset of speakers such that regions corresponding to a plurality of speaker classes associated with the random subset of speakers are determined.

According to an embodiment of the present disclosure, training the artificial neural network discrimination model may include training the artificial neural network discrimination model using the selected random subset of speakers so as to minimize a distance between features in one speaker class among the plurality of speaker classes associated with the selected random subset of speakers, and maximize a distance between features in the plurality of speaker classes.

According to an embodiment of the present disclosure, the inputting the extracted speaker feature vector into the hash function and calculating a hash value corresponding to the feature representing the voice of the target speaker may include inputting the extracted speaker feature vector into the trained artificial neural network discrimination model, and outputting information on a region for at least one speaker class corresponding to the extracted speaker feature vector from among a plurality of regions corresponding to the plurality of speaker classes, and generating a hash value corresponding to the feature representing the voice of the target speaker by using a value corresponding to each of the regions for the at least one speaker class.

According to an embodiment of the present disclosure, the generating the discriminative transform function based on the selected random subset of speakers may include generating linear discriminant analysis (LDA) transformation matrices repeatedly by the predetermined number of times using each of the selected random subset of speakers.

According to an embodiment of the present disclosure, the inputting the extracted speaker feature vector into the hash function and calculating a hash value corresponding to the feature representing the voice of the target speaker may include projecting, by using each of the generated LDA transformation matrices, the extracted speaker feature vectors to a random speaker-variability subspace corresponding to each of the generated LDA transformation matrices, when each of the projection regions of the extracted speaker feature vector belongs to one speaker class among a plurality of speaker classes associated with the random speaker-variability subspace, assigning a value corresponding to the one speaker class to each of the projection regions of the extracted speaker feature vector, and generating a hash value corresponding to the extracted feature vector on the basis of the assigned values, and.

According to an embodiment of the present disclosure, the generating the LDA transformation matrices repeatedly by the predetermined number of times using each of the selected random subset of speakers may include for each of the selected random subset of speakers, generating a scatter matrix between a plurality of speaker classes associated with the random subset of speakers using the training voice data, generating a scatter matrix within one speaker class associated with the random subset of speakers using the training voice data, and generating the LDA transformation matrices such that a ratio of the scatter matrix between the plurality of speaker classes and the scatter matrix within the one speaker class is maximized.

According to an embodiment of the present disclosure, the predetermined number may include a total number of predetermined hash tables.

According to an embodiment of the present disclosure, the method for searching content including a same voice as a voice of a target speaker may further include extracting features representing voices of one or more speakers included in each of a plurality of contents searchable on the network, and calculating a hash value corresponding to each of the extracted features representing the voices of one or more speakers using the hash function.

According to an embodiment of the present disclosure, the searching content associated with the similar hash value to the calculated hash value may include comparing each of a plurality of hash values calculated for each of a plurality of contents searchable on the network with a hash value associated with the target speaker, and when there exist one or more contents associated with the similar hash value to the hash value for the voice of the target speaker, outputting the one or more contents associated with the similar hash value.

According to an embodiment of the present disclosure, a computer readable storage medium may be provided, which may record a program including instructions for performing steps according to the method for searching content including the same voice as the voice of the target speaker as described above.

In addition, an apparatus, a system, a technical means, and the like associated with the method for searching content including the same voice as the voice of the target speaker as described above may also be disclosed.

Advantageous Effects

According to some embodiments of the present disclosure, in order to index a voice of a specific person, the feature of such a voice is expressed in a hash form, and the voice of the specific person can be searched using the hash form, thereby finding out the content that the voice of the specific person is abused or duplicated and preventing unauthorized use of such content.

According to some embodiments of the present disclosure, when generating the hash value corresponding to the feature of the speech, an LDA transform function can be generated using the supervised method in the LSH method, which is an unsupervised method, and the generated LDA transform function can be used as a projection matrix, thereby minimizing the performance degradation for voice search while maximizing the search speed as compared to linear search.

DETAILED DESCRIPTION OF THE INVENTION

Figure 1:
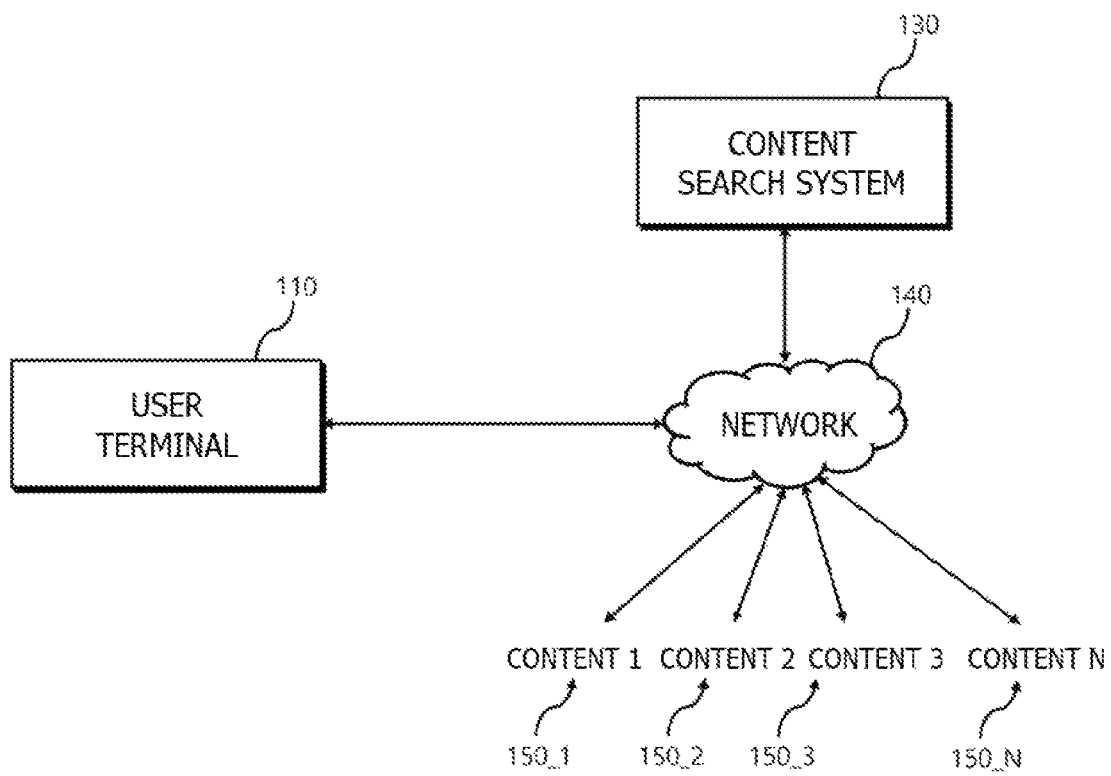
FIG. 1 is a diagram illustrating a system for searching content including a same voice as a voice included in a sound generated by a voice from among a plurality of contents searchable on a network according to an embodiment.

Advantages and features of the disclosed embodiments and methods of accomplishing the same will be apparent by referring to embodiments described below in connection with the accompanying drawings. However, the present disclosure is not limited to the embodiments disclosed below, and may be implemented in various different forms, and the embodiments are merely provided to make the present disclosure complete, and to fully disclose the scope of the invention to those skilled in the art to which the present disclosure pertains.

The terms used herein will be briefly described prior to describing the disclosed embodiments in detail.

The terms used herein have been selected as general terms which are widely used at present in consideration of the functions of the present disclosure, and this may be altered according to the intent of an operator skilled in the art, conventional practice, or introduction of new technology. In addition, in a specific case, a term is arbitrarily selected by the applicant, and the meaning of the term will be described in detail in a corresponding description of the embodiments. Therefore, the terms used in the present disclosure should be defined based on the meaning of the terms and the overall contents of the present disclosure rather than a simple name of each of the terms.

As used herein, the singular forms "a," "an," and "the" are intended to include the plural forms as well, unless the context clearly indicates the singular forms. Further, the plural forms are intended to include the singular forms as well, unless the context clearly indicates the plural forms.

As used throughout the description, when one part is referred to as "comprising" (or "including" or "having") other elements, the part can comprise (or include or have) only those elements or other elements as well as those elements unless specifically described otherwise.

Furthermore, the term "unit" or "module" used herein denotes a software or hardware element, and the "unit" or "module" performs certain roles. However, the meaning of the "unit" or "module" is not limited to software or hardware. The "unit" or "module" may be configured to be in an addressable storage medium or to execute one or more processors. Accordingly, as an example, the "unit" or "module" includes elements such as software elements, object-oriented software elements, class elements, and task elements, processes, functions, attributes, procedures, subroutines, program code segments, drivers, firmware, micro-codes, circuits, data, database, data structures, tables, arrays, and variables. Furthermore, functions provided in the elements and the "units" or "modules" may be combined as a smaller number of elements and "units" or "modules," or further divided into additional elements and "units" or "modules".

According to an embodiment of the present disclosure, the "unit" or "module" may be implemented as a processor and a memory. The term "processor" should be interpreted broadly to encompass a general-purpose processor, a central processing unit (CPU), a microprocessor, a digital signal processor (DSP), a controller, a microcontroller, a state machine, and so forth. Under some circumstances, the "processor" may refer to an application-specific integrated circuit (ASIC), a programmable logic device (PLD), a field-programmable gate array (FPGA), and so on. The term "processor" may refer to a combination of processing devices, e.g., a combination of a DSP and a microprocessor, a plurality of microprocessors, one or more microprocessors in conjunction with a DSP core, or any other combination of such configurations.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, and the like. The memory is said to be in electronic communication with a processor if the processor can read information from and/or write information to the memory. The memory integrated with a processor is in electronic communication with the processor.

In the present disclosure, "voice" may refer to a specific and physical sound emitted from a pronunciation organ of a person, and the feature representing the voice may vary depending on speaker, that is, depending on person who utters the sound. In addition, the "voice" may refer to a voice included in content generated through any voice synthesis technology.

In the present disclosure, the "content" may include any information that includes a voice of a speaker which is produced in a digital manner and searchable by a content search system, or a content thereof. For example, the "content" may include audio content generated by a voice of a speaker, and video content that includes such audio content.

In the present disclosure, the "voice of a speaker" may refer to a specific and physical sound produced through the pronunciation organ of the speaker, or may include a synthesized voice reflecting the feature of the voice of the speaker included in the sound synthesized through the speech synthesis technology.

In the present disclosure, the "hash function" may refer to a function or network (e.g., a neural network, a deep neural network) configured to input data or information having any length and output a hash value of a fixed length. In addition, the "hash function" may include a hash function connecting a plurality of hash functions, or may include a plurality of hash functions or networks that are used independently.

In the present disclosure, the term "on a network" or "in a network" may refer to a state in which search or access is enabled through any electronic device capable of wired/wireless communication. For example, the meaning of "on a network" may refer to a state that any content stored in any device connected to any electronic device by wire or wirelessly is searchable or accessible.

In the present disclosure, "similar" may include "same" or "similar."

Hereinafter, exemplary embodiments will be fully described with reference to the accompanying drawings in such a way that those skilled in the art can easily carry out the embodiments. Further, in order to clearly illustrate the present disclosure, parts not related to the description are omitted in the drawings.

FIG. 1 is a diagram illustrating a system 130 for searching content that includes same voice as a voice included in a sound generated by a voice of a speaker among a plurality of contents 150_1, 150_2, 150_3, . . . , 150_N searchable on a network 140, according to an embodiment. In this example, a user terminal 110 may receive the voice of the speaker through an input means (e.g., a microphone, and the like), and may have a communication module for connection to any device and/or system connected to the network 140 by wire or wirelessly, and may include any electronic device (e.g., a smartphone, a PC, a tablet PC, and the like) capable of outputting content. According to an embodiment, the user terminal 110 may receive a sound generated by the voice of the speaker. For example, the user terminal 110 may receive a sound generated by the voice of the speaker through a microphone. Alternatively, the sound generated by the voice of the speaker may include a sound stored in the user terminal 110, or a sound received from any device that is retrievable or accessible by the user terminal 110. In addition, the sound generated by the voice of the speaker may be a sound that includes a synthesized voice generated using the speech synthesis technology. According to another embodiment, the user terminal 110 may receive the audio content that includes, at least in part, a sound generated by voice, or may receive video content that includes such sound. In order to search the content that includes the same voice as the voice included in the sound generated by the voice of the speaker, that sound, audio content, and/or video content may be provided to the content search system 130 as a query.

The content search system 130 may be configured to extract a feature that represents the voice included in the received sound, audio content, and/or video content. In addition, the content search system 130 may be configured to calculate a hash value corresponding to the extracted feature that represents the voice of the speaker. For example, this hash value may be calculated using the extracted feature and the hash function. In this example, the voices of a plurality of speakers may be classified and the voices of the speakers may be indexed and stored as the hash value. According to the characteristic of the hash value, a plurality of voices associated with a similar hash value to the hash value corresponding to the feature representing the extracted voice of the speaker may refer to the same voice as the extracted voice of the speaker. In this example, the similar hash value may refer to a hash value that is the closest to, or has a predetermined degree of similarity to the hash value corresponding to the feature representing the extracted voice of the speaker.

The content search system 130 may be configured to search or access a plurality of contents 150_1 to 150_N through the network 140, and extract features representing the voices of one or more speakers included in each of the plurality of contents 150_1 to 150_N. Then, the content search system 130 may be configured to calculate a hash value corresponding to each of the extracted features representing the one or more speaker voices. In this example, the content search system 130 may calculate a hash value corresponding to the features representing the voices of one or more speakers included in each of the plurality of contents 150_1 to 150_N by using the same hash function as the hash function that is used when calculating the hash value for the voice of the speaker included in the sound. According to an embodiment, the hash value for the voices of one or more speakers included in each of the plurality of contents 150_1 to 150_N extracted as described above may be stored in any device searchable or accessible by the content search system 130. For example, this hash value may be stored in the content search system 130 or in a server or cloud system accessible by the content search system 130. According to another embodiment, the hash value may be provided to any device that stores a plurality of contents 150_1 to 150_N, and stored in association with the plurality of contents 150_1 to 150_N.

The content search system 130 may be configured to compare the hash value associated with the sound generated by the received voice of the speaker with each of a plurality of hash values associated with each of the plurality of contents 150_1 to 150_N. Then, when one or more contents associated with the similar hash value to the hash value for the received voice of the speaker are searched, the content search system 130 may be configured to output the one or more searched contents. According to an embodiment, the one or more contents associated with the same hash value may be output or provided to the user terminal 110 that provided the sound generated by the voice of the speaker. For example, a list of the one or more contents associated with the similar hash value may be provided to the user terminal 110. The user of the user terminal 110 may check the one or more contents provided in this way, and find content with abuse or duplication of a voice of a specific speaker and further take measures to prevent unauthorized use of such content.

Figure 2:
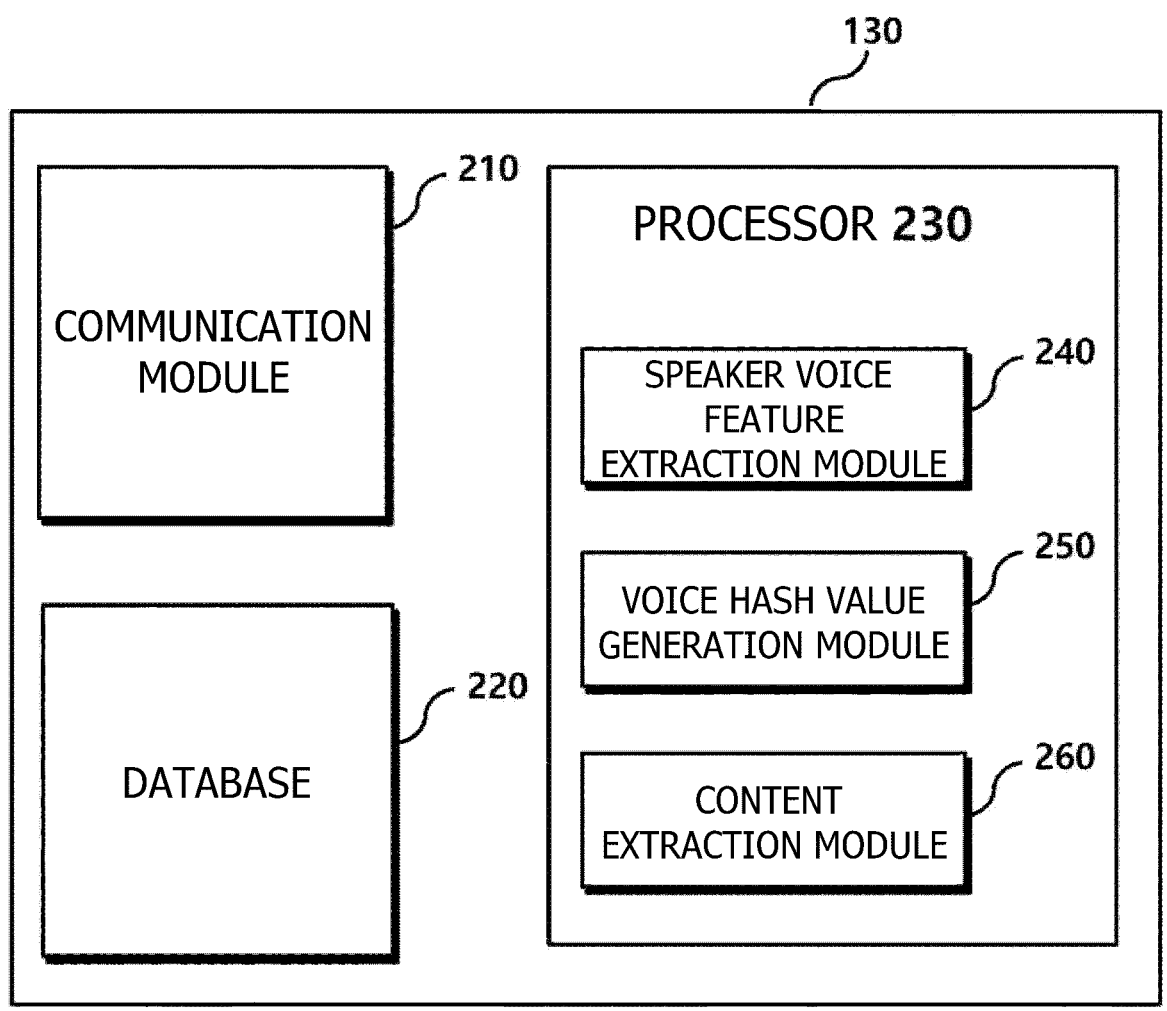
FIG. 2 is a block diagram illustrating a content search system according to an embodiment.

FIG. 2 is a block diagram illustrating a content search system 130 according to an embodiment. The content search system 130 may be configured to include a communication module 210, a database 220, and a processor 230. In this example, the processor 230 may be configured to include a speaker voice feature extraction module 240, a voice hash value generation module 250, and a content extraction module 260. The communication module 210 may be configured such that the content search system 130 transmits and receives signals or data to and from an external device through the network 140. In this example, the external device may include the user terminal 110 that is capable of providing a sound generated by a voice of a specific speaker to the content search system 130 as a query and receiving content of the same voice as the voice of the specific speaker, an electronic device storing one or more contents, any server device storing training voice data and/or hash value information, and so on, a clouding system, and so on.

According to an embodiment, the communication module 210 may be configured to receive the sound generated by the voice of a target speaker from the user terminal 110. In addition, the communication module 210 may be configured to receive a plurality of contents from a plurality of external devices. The sound generated by the voice of the target speaker received from the user terminal 110 and the content received from a plurality of external devices may be provided to the speaker voice feature extraction module 240 of the processor 230. In response to receiving the sound generated by the voice of the target speaker, among the plurality of contents received from the plurality of external devices, the content including the same or similar voice to the voice of the target speaker may be transmitted to the user terminal 110 through the communication module 210.

The speaker voice feature extraction module 240 of the processor 230 may be configured to extract features representing the voice of the target speaker from the received sound. According to an embodiment, the speaker voice feature extraction module 240 may be configured to extract a speaker feature vector corresponding to the voice of the target speaker from the received sound. The speaker feature vector may refer to any feature vector that represents the feature of the target speaker to distinguish the target speaker from a plurality of other speakers.

According to an embodiment, the speaker feature vector may be represented as a single low-dimensional latent vector so as to distinguish the voice of the speaker included in the received sound. This single low-dimensional latent vector may include an i-vector. This i-vector technique may be considered under Gaussian Mixture Model (GMM)-Universal Background Mode (UBM), and specifically, may be based on the estimation that each individual mean vector in GMM can represent the shift of the mean vector in UBM, and that the change of all means can be controlled by a single vector (i.e. i-vector). In this example, the i-vector ω (speaker feature vector) may be expressed by Equation 1 below.

$$M=m+Tw \quad \text{[Equation 1]}$$

where, M may denote the speaker, m may denote a speaker dependent and independent GMM super-vector, and T may denote a total variability matrix. The i-vector may be trained with any training voice dataset so as to effectively distinguish the voice of the speaker.

According to another embodiment, the speaker feature vector may include a speaker embedding vector using DNN. The speaker embedding vector may use a large dataset including augmented data such as background noise. In this example, the speaker embedding vector may be extracted from one of the hidden layers from the trained network to classify N speakers in the training voice dataset. For example, the speaker embedding vector may include an x-vector extracted from a neural network architecture based on Time Delayed Neural Network (TDNN). This x-vector may also have advantages from augmented data with background noise. The x-vector may be trained with any training voice dataset so as to effectively distinguish the voice of the speaker. The speaker voice feature extraction module 240 may provide the feature representing the voice of the target speaker extracted from the received sound or the speaker feature vector to the voice hash value generation module 250 of the processor 230.

The speaker voice feature extraction module 240 may receive, through the communication module 210, a plurality of contents searchable on a network. The speaker voice feature extraction module 240 may extract the features representing the voices of one or more speakers included in each of the plurality of contents. For example, the speaker voice feature extraction module 240 may extract a feature representing a voice included in an audio segment (audio) that is a part of the received content. The speaker voice feature extraction module 240 may be configured to extract the features representing one or more voices included in each of the plurality of received contents or the speaker feature vector (e.g., i-vector, x-vector, and the like), in the same manner as the method for extracting the feature or the speaker feature vector of the target speaker. The feature or the speaker feature vector extracted in association with a plurality of contents may be provided to the voice hash value generation module 250.

The voice hash value generation module 250 may generate, by using a hash function, a hash value corresponding to the feature representing the voice of the speaker received from the speaker voice feature extraction module. In this example, the hash function may be generated using at least one of Locality Sensitive Hashing (LSH), Random Speaker-variability Subspace (RSS) projection, Discriminative Transform Function or Network. The hash function will be described in detail using FIGS. 4 to 6 below. According to an embodiment, the voice hash value generation module 250 may be configured to use the hash function to calculate the hash value corresponding to the feature representing the voice of the target speaker. In addition, the voice hash value generation module 250 may be configured to use the hash function that is used to calculate the hash value for the target speaker, to calculate the hash value corresponding to each of the features representing the voices of one or more speakers included in a plurality of received contents. The hash value calculated as described above may be provided to the content extraction module 260 of the processor 230.

The content extraction module 260 may be configured to search content associated with a similar hash value to a hash value for the received voice of the target speaker, from among a plurality of contents searchable on the network. According to an embodiment, the content extraction module 260 may be configured to compare the received hash value for the voice of the target speaker with each of the plurality of hash values calculated for the plurality of retrieved contents, to thus extract one or more contents associated with the similar hash value to the hash value for the voice of the target speaker. According to another embodiment, a plurality of contents may be classified according to a voice feature and/or a corresponding hash value included in the content, and the content extraction module 260 may be configured to select a class corresponding to the voice of the target speaker, and compare the hash value corresponding to the voice of the target speaker with the hash values included in the selected class to extract one or more contents associated with the similar hash value.

In the present disclosure, the similar hash value (second hash value) to the hash value (first hash value) corresponding to the feature of the voice of the target speaker may refer to a hash value having at least a predetermined degree of similarity among a plurality of hash values. In this example, the predetermined degree of similarity may refer to a degree of similarity required to determine that two hash values indicate the same voice, and it may be determined or trained using training voice data. For example, when the first hash value is compared with each of the plurality of hash values, a hash value having different bits from the hash bits of the first hash value by at least a predetermined number may be selected as the second hash value. As another example, the second hash value similar to the first hash value may be selected in consideration of the weights of the hash bits included in the hash value. Under this configuration, weights may be assigned to hash bits included in the hash value, in which, when comparing the hash bits included in the first hash value with the hash bits included in each of the plurality of hash values, the content extraction module 260 may calculate the degrees of similarity for the first hash value and each of the plurality of hash values in consideration of different hash bits and the assigned weights, determine one or more hash values having at least a certain degree of similarity to be the second hash value, and extract one or more contents associated with the second hash value.

The extracted content may be provided through the communication module 210 to the user terminal that provided the voice of the target speaker. For example, when the content includes a plurality of contents, information on the plurality of contents (e.g., link information, thumbnails, and the like) may be generated in the form of a list and provided to the user terminal.

The database 220 may include any data or information used or output by the processor 230. According to an embodiment, the database 220 may be configured to store the hash values corresponding to the features representing a plurality of voices. For example, the database 220 may include a hash table that is used to calculate a hash value, and each hash table may include the hash bits as well as the weights for each hash bit. In addition, the database 220 may store a hash function, and may be configured to store the training voice data used to calculate the hash function. In this example, the training voice data may include any set of voice data that is trained to more effectively distinguish the voice of each speaker from the voices of a plurality of speakers. For example, the training voice data may include a one-hot speaker ID-vector and/or an embedding vector representing a speaker generated based on the features of the voice of the speaker. Alternatively, the training voice data may include any training data used to train any neural network used to distinguish speakers. In FIG. 2, the content search system 130 is configured to include the database 220, but is not limited thereto, and the database may be stored in any device accessible to the content search system 130.

Figure 3:
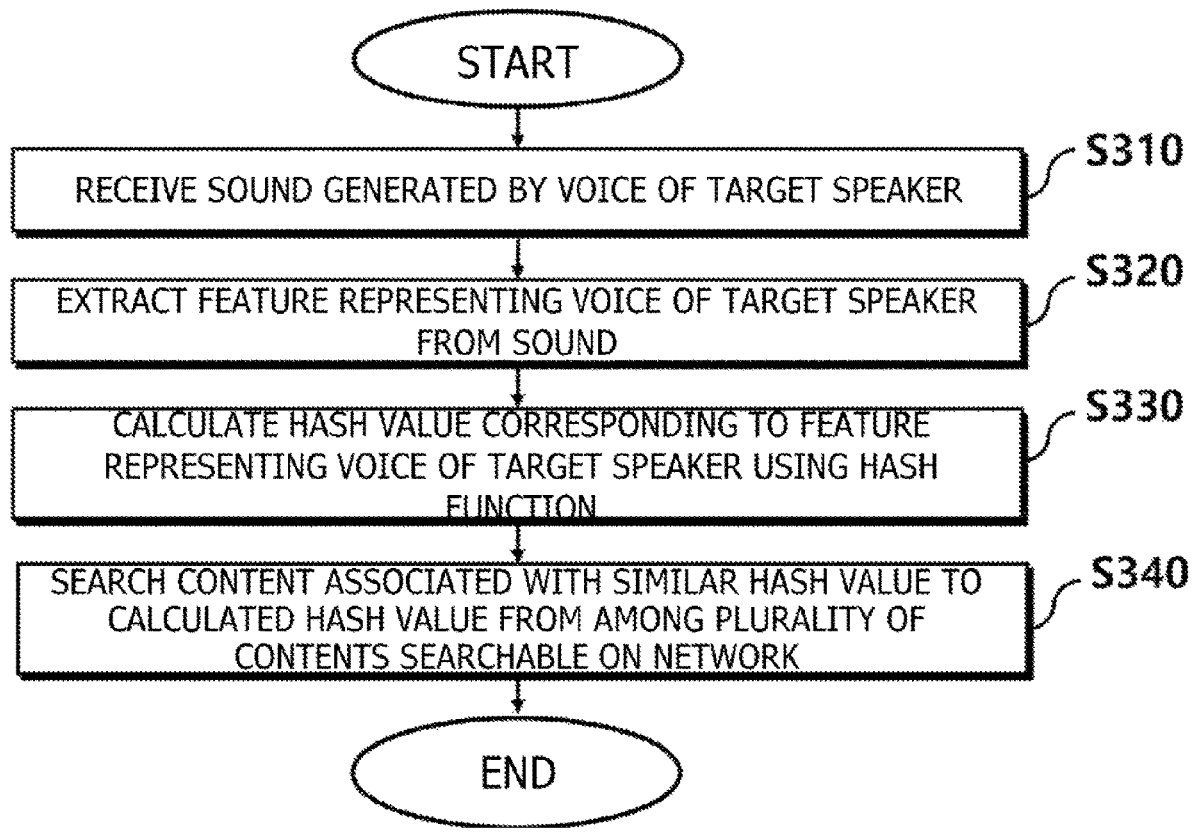
FIG. 3 is a flowchart illustrating a method for searching content including a same voice as a voice of a target speaker according to an embodiment.

FIG. 3 is a flowchart illustrating a method for searching content that includes the same voice as the voice of the target speaker according to an embodiment. First, at S310, the content search system 130 may receive the sound generated by the voice of the target speaker. For example, the content search system 130 may receive audio content or video content including at least a part of the sound generated by the voice of the target speaker. In addition, the sound generated by the voice of the target speaker may be received from any electronic device that wants to search content having the same voice as the voice of the target speaker.

The content search system 130 may be configured to extract a feature representing the voice of the target speaker from the received sound, at S320. For example, the feature representing the voice of the target speaker may be represented by the speaker feature vector such as i-vector, x-vector, and the like. At S330, the content search system 130 may calculate the hash value corresponding to the feature representing the voice of the target speaker using the hash function. Then, the content search system 130 may search one or more contents associated with the similar hash value to the hash value for the voice of the target speaker, among a plurality of contents searchable on the network. For example, the content search system 130 may calculate the hash value for each of a plurality of contents searchable on the network, and compare each of the calculated hash values with the hash value for the voice of the target speaker to search one or more contents associated with the similar hash value (e.g., the hash value having at least a certain degree of similarity).

Figure 4:
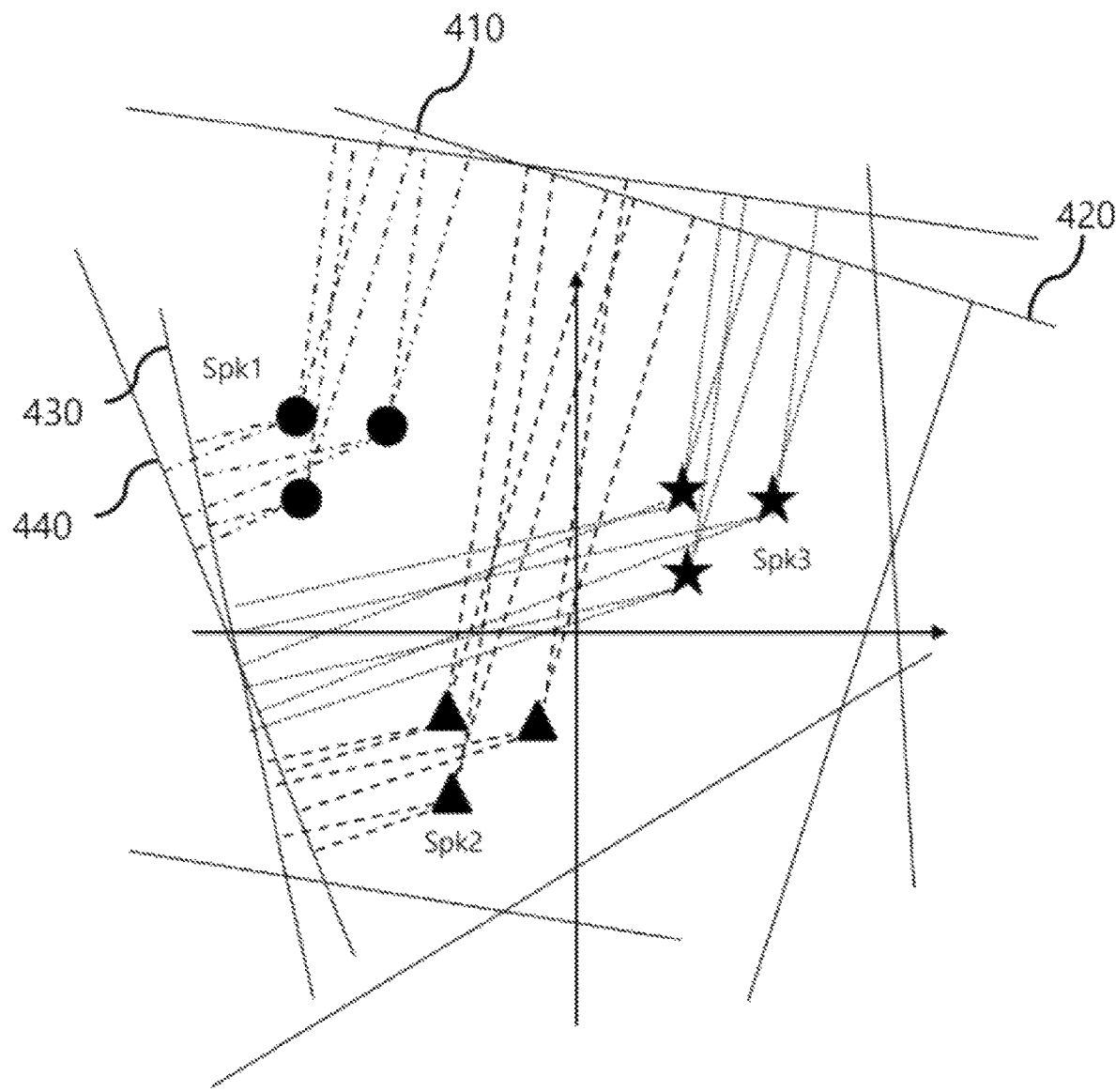
FIG. 4 is an exemplary diagram illustrating a method for randomly projecting a speaker feature vector randomly extracted using a Locality Sensitive Hashing (LSH) technique according to an embodiment.

FIG. 4 is an exemplary diagram illustrating a method for randomly projecting a speaker feature vector randomly extracted using a Locality Sensitive Hashing (LSH) technique according to an embodiment. In this example, the LSH technique is one of the nearest neighbor search algorithms, and it may represent an algorithm capable of quickly searching a related voice from a large amount of data while maintaining the accuracy of its search for the audio segment having the same voice using i-vector. In addition, the LSH technique is an unsupervised hash technique that is independent of data, and it can randomly project a speaker feature vector (here, i-vector) representing the voice of the speaker on a hyperplane. This hash technique can map the same or similar vector having the same or similar features to the same region (e.g., bin, bucket) with a high probability. For example, it can calculate the hash value by using the following equation, that is, the hash function.

$$w_r = h_r(w) = \text{sgn}(w^T r) = \begin{cases} 1 & \text{if } w^T r \geq 0 \\ 0 & \text{if } w^T r < 0 \end{cases} \quad \text{[Equation 2]}$$

where, r may represent the d-dimension random projection vector calculated from the standard normal distribution, and d may represent the dimension of the initial speech feature vector, i-vector ω (speaker feature vector). The i-vector ω can be mapped using the hash function mentioned above and expressed as a hash value.

According to an embodiment, various hash functions may be concatenated, and the use of multiple and independent hash functions can lead into improved performance. For example, the d×k dimension random projection matrix $R_l$ may be used, where k denotes the number of hyperplanes per hash table, and l denotes the index of the hash table ($1 \leq l \leq L$), and L denotes the index of the hash table. In this example, k and L may be appropriately selected in consideration of performance and complexity.

FIG. 4 shows a graph of projecting a two-dimensional vector randomly extracted from the feature vector ω representing the speech on a one-dimensional vector using a projection vector called r using Equation 2 described above. As illustrated, FIG. 4 illustrates a process of randomly projecting two-dimensional speaker feature vectors spk1, spk2, and spk3 on each of four randomly extracted hyperplanes 410, 420, 430, and 440. Equation 2 described above may be used to project each of the feature vectors spk1, spk2, and spk3 on each hyperplane 410, 420, 430, and 440. When the feature vectors spk1, spk2, and spk3 are projected to each of the hyperplanes 410, 420, 430, and 440, regions that can distinguish the feature vectors spk1, spk2, and spk3 may be determined. Then, the feature representing the voice of the speaker received from the speaker voice feature extraction module 240, that is, the speaker feature vector may be projected to the hyperplanes 410, 420, 430, and 440 using a projection vector called r, and a hash value corresponding to the speaker feature vector may be calculated based on a value assigned to each projection region. When the region corresponding to the hyperplane on which the speaker feature vector is projected is 0, a hash bit 0 may be assigned, and when it is 1, the hash bit 1 may be assigned. In other words, this method uses the LSH technique based on random projection in which the hash value is generated as r is randomly extracted and projected a lot. In this example, since the speaker feature vectors can be projected to the four hyperplanes, a hash value of 4 bits may be expressed. Alternatively, 3 hyperplanes may be selected out of 4 hyperplanes, in which case a hash value of 3 bits may be expressed. This hash value may be used to index the speaker feature vector.

Figure 5:
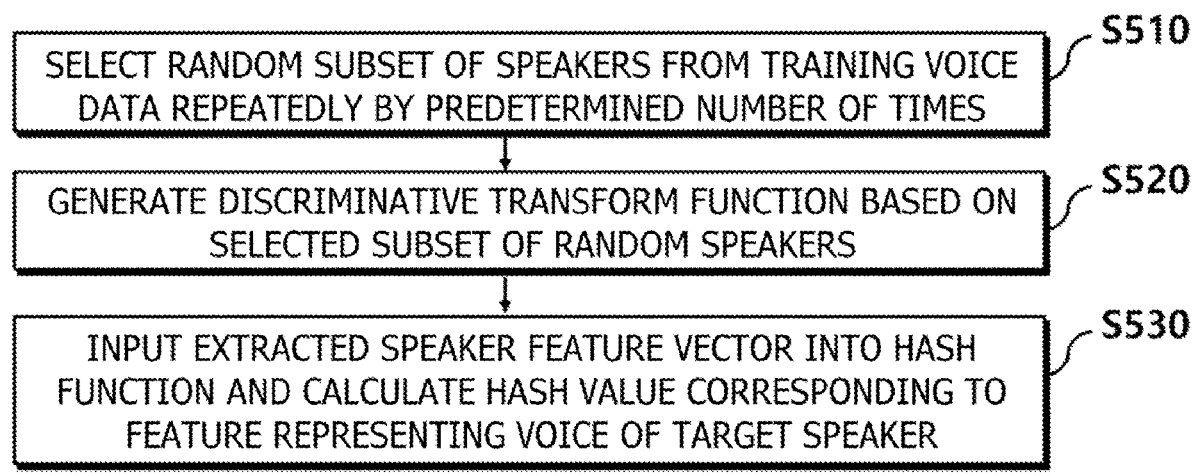
FIG. 5 is a flowchart illustrating a method for calculating the hash value for the speaker feature vector representing the voice of the speaker using discriminative transform function for the LSH according to an embodiment.

FIG. 5 is a flowchart illustrating a method for calculating the hash value for the speaker feature vector representing the voice of the speaker using discriminative transform function for the LSH according to an embodiment. According to an embodiment, in order to more effectively map the voice of the same speaker to the same region, the discriminative transform function may be generated by using a speaker label in LSH which is the unsupervised hash technique described above, that is, by using the supervised technique, and the generated discriminative transform function may be used in place of the projection matrix $R_1$ described in FIG. 4. In this example, the discriminative transform function may refer to any discriminant transform method that is capable of minimizing the distance between features in the same speaker class and maximizing the distance between features in different classes. According to an embodiment, this discriminative transform function may be generated using a random subset of speakers, by training an artificial neural network discrimination model (e.g., a deep neural network) such that regions corresponding to a plurality of speaker classes associated with the random subset of speakers are determined. A nonlinear function (network) may be generated. According to another embodiment, a Linear Discriminant Analysis (LDA) transform matrix may be generated as such a discriminative transform function using voice or utterances from the random subset of speakers, and the generated matrix may be used in place of the projection matrix $R_1$ described in FIG. 4.

At S510, the voice hash value generation module S250 may repeatedly select the random subset of speakers from the training voice data a predetermined number of times. In this example, the training voice data may include the random subset of speakers, and may include information on the speaker label that can distinguish each subset of speakers. In addition, the predetermined number may represent the total number of predetermined hash tables. Accordingly, the random subset of speakers may be associated with a plurality of speaker classes. According to an embodiment, Si may be a subset of speakers randomly selected from the training voice data (where, S is a speaker), in which the number of speakers may be $N_s$.

Then, the discriminative transform function may be generated based on each of the selected subsets of random speakers, at S520. This discriminative transform function may be used to generate the hash function. According to an embodiment, an artificial neural network discrimination model may be trained using the random subset of speakers selected from the training voice data so as to determine the regions corresponding to a plurality of speaker classes associated with the random subset of speakers, and the trained artificial neural network discrimination model may be used to generate a hash function as a nonlinear function or a network. For example, among the speaker classes associated with the subsets of random speakers selected from the training voice data using the selected random subset of speakers, the artificial neural network discrimination model may be trained to minimize the distance within the same speaker class and maximize the distance within different speaker classes, and the artificial neural network discrimination model may be used in place of the projection matrix $R_1$ described in FIG. 4, to determine which of the subsets of random speakers the feature vector representing the voice of the target speaker belongs to.

According to another embodiment, the LDA transformation matrix may be repeatedly generated by a predetermined number of times using each of the selected subsets of random speakers. For example, a between-class scatter matrix associated with the random subset of speakers may be generated using the training voice data for each of the selected random subsets of speakers. In addition, a within-class scatter matrix associated with the random subset of speakers may be generated using the training voice data for each of the selected random subsets of speakers. Then, the LDA transformation matrix may be generated such that the ratio of the scatter matrix between a plurality of speakers and the scatter matrix within one speaker class is maximized.

Then, at S530, the voice hash value generation module 250 may be configured to input the extracted speaker feature vector into the hash function to calculate a hash value corresponding to the feature representing the voice of the target speaker. The generated hash value may be transmitted to the content extraction module 260 and used to search one or more contents associated with the similar hash value. According to an embodiment, the voice hash value generation module 250 may be configured to input the extracted speaker feature vector into the trained artificial neural network discrimination model, and output information on a region for at least one speaker class corresponding to the extracted speaker feature vector from among a plurality of regions corresponding to a plurality of speaker classes associated with the random subset of speakers. Then, the hash value corresponding to the feature representing the voice of the target speaker may be calculated using a value corresponding to each of the regions for at least one class. According to another embodiment, a method for calculating the hash value using a LDA transform function, which is one of the linear discriminative transform functions, will be described in detail with reference to FIGS. 6 and 7 below.

Figure 6:
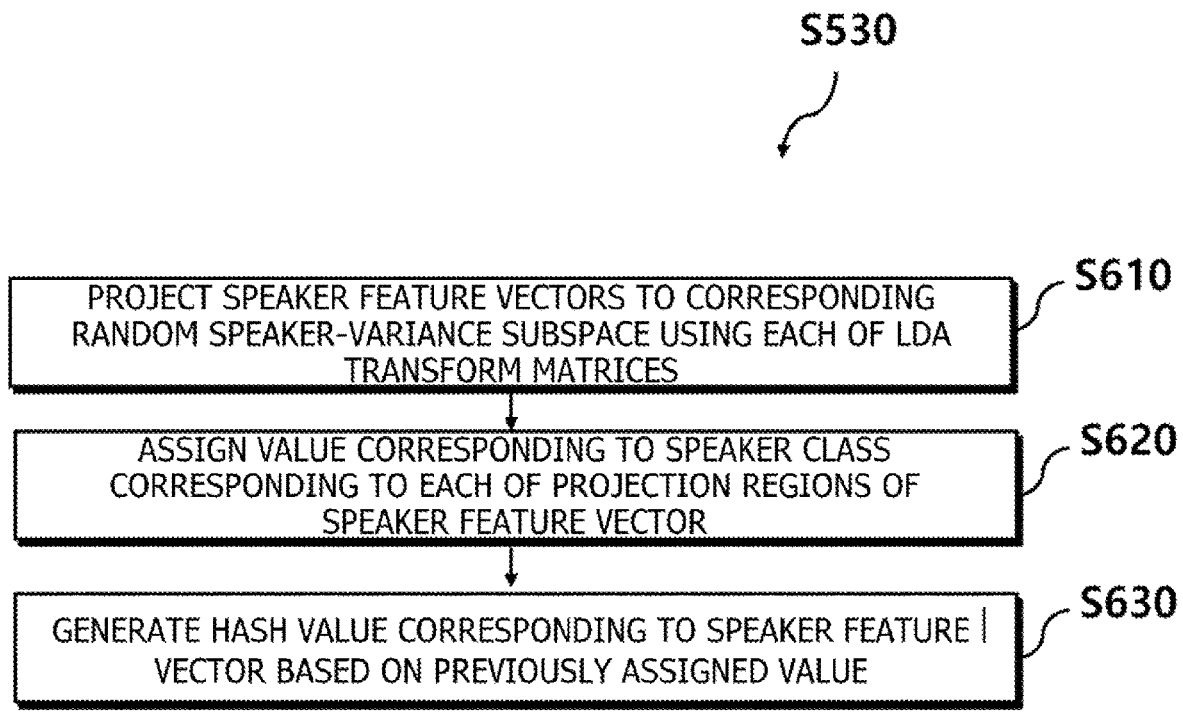
FIG. 6 is a flowchart illustrating a method for calculating a hash value for a feature vector by projecting a speaker feature vector representing a voice of a speaker on a random speaker-variability subspace using a linear discriminant analysis (LDA) function.

FIG. 6 is a flowchart illustrating a method for calculating a hash value for a feature vector by projecting a speaker feature vector representing a voice of a speaker on a random speaker-variability subspace using a linear discriminant analysis (LDA) function. At S610, the voice hash value generation module 250 may use each of the LDA transformation matrices generated by repeating a predetermined number of times to project the speaker feature vector on a random speaker-variability subspace (RSS) corresponding to the LDA transformation matrix. In this example, the random speaker-variability subspace may represent a variability subspace associated with the random subset of speakers. This projection method may replace any projection matrix $R_1$ of the LSH technique.

For hyperparameter $N_s$, when too many speakers are selected, many redundant checks can occur between projection matrices. Taking this into consideration, it may be desirable to choose $N_s$ more than the length k of the hash bit and project to the k dimension. In this embodiment, in order to maintain the size of each hash region in a balanced manner, Equation 3 below may be used as a hash function.

[Equation 3]
$$h_r(w) =$$

$$\text{sgn}(w^T r + b) = \begin{cases} 1 & \text{if } w^T r \geq 0 \\ 0 & \text{if } w^T r < 0 \end{cases} \text{ where } b = -\frac{1}{N}\sum_{i=1}^{N} w_i^T r$$

The parameters or constants are the same as those described in FIG. 4, where b may represent the average of the projected data, and may be represented by $$b = -\frac{1}{N}\sum_{i=1}^{N} w_i^T r.$$

At S620, a value corresponding to the speaker class corresponding to each of the projection regions of the speaker feature vector may be assigned. In this example, each of the random subset of speakers and the random speaker-variability subspace may be associated with a plurality of speaker classes. When each of the projection regions of the speaker feature vector belongs to one of a plurality of speaker classes included in the corresponding random speaker-variability subspace, a value corresponding to one speaker class may be assigned to each of the projection regions of the speaker feature vector.

Then, at S630, a hash value corresponding to the speaker feature vector may be generated based on the previously assigned value. As a result of searching the voice of the speaker by using the projection method using the LDA transformation matrix in the RSS space, the method may provide a voice search of a speaker that is 100 times faster than the conventional speaker voice linear search and 7 times faster than LSH.

Figure 7:
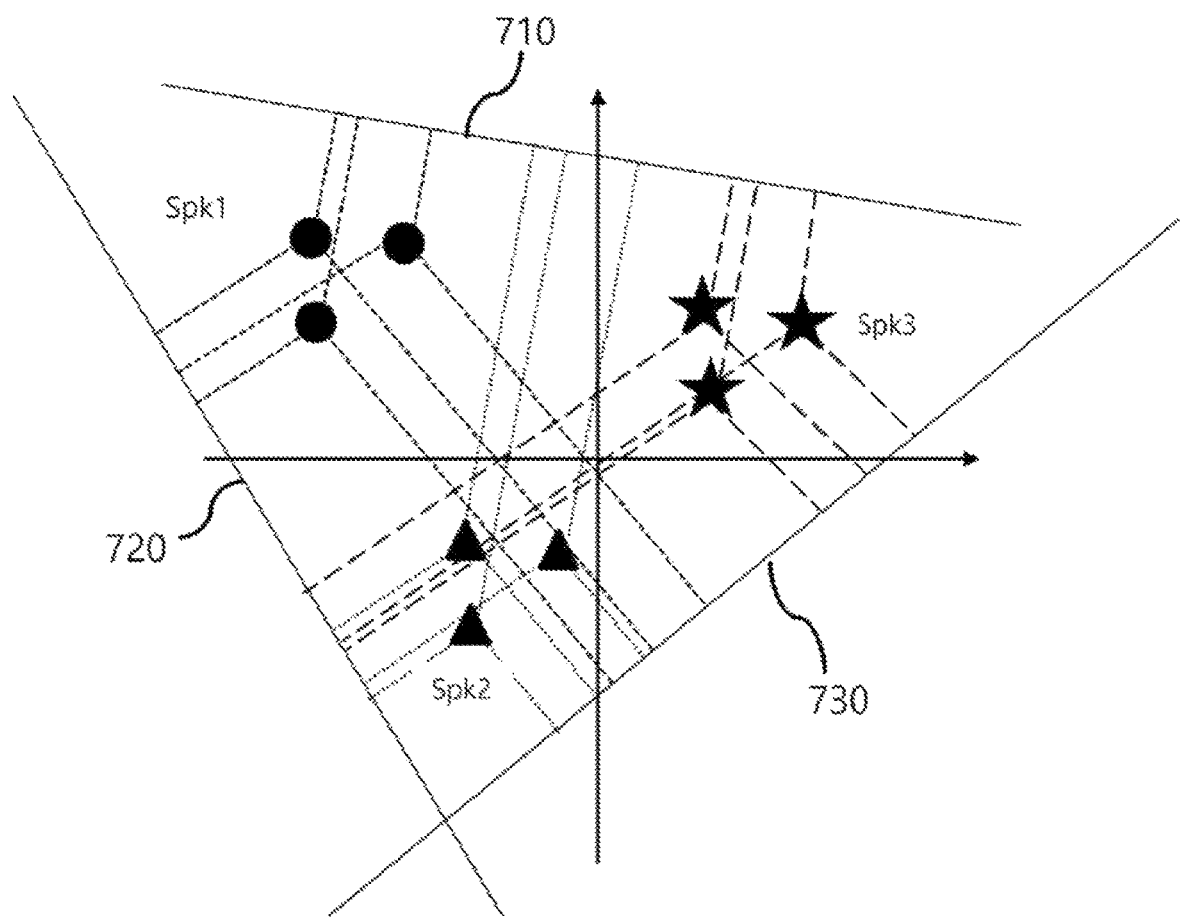
FIG. 7 is an exemplary diagram illustrating a method of projecting a random subset of speakers selected from the training voice data into the random speaker-variability subspace using LDA function for LSH according to an embodiment.

FIG. 7 is an exemplary diagram illustrating a method for projecting a random subset of speakers Spk1, Spk2, and Spk3 selected from the training voice data into the random speaker-variability subspace using LDA function for LSH according to an embodiment. As illustrated, a two-dimensional vector can be projected to a one-dimensional vector using a method for RSS projection of a feature vector ω (speaker feature vector) representing the speech using Equation 3 described above based on the LSH technique. Using the LDA technique described above, r may be calculated. That is, since different voices in the same class are searched rather than the exact same voice is searched, r may be calculated so that the class can be well distinguished.

As illustrated, the random subset of speakers Spk1, Spk2, and Spk3 selected from the training voice data may be projected to hyperplanes 710, 720, and 730 using r calculated through the LDA transformation matrix mentioned above. The hyperplanes 710, 720, and 730 may include hyperplanes associated with each of the three hash tables. When the random subset of speakers Spk1, Spk2, and Spk3 are projected to each hyperplane 710, 720, and 730, regions that can distinguish each random subset of speakers may be determined on the hyperplanes 710, 720, and 730. Under this configuration, the feature vector co representing the voice of the speaker received from the speaker voice feature extraction module 240 may be projected to each hyperplane 710, 720, and 730 using r calculated through the LDA transformation matrix. According to an embodiment, when there are three speaker classes, two hyperplanes may be selected, and the speaker feature vector co may be projected to the selected two hyperplanes using r calculated through the LDA transformation matrix to calculate a hash value (bit). For example, when r, which can distinguish between the speaker classes Spk2 and Spk3, is calculated and then the speaker feature vector ω is projected to the hyperplane (e.g., 730) using r, when it is close to speaker class 2, a hash bit 1 may be generated, and when it is close to speaker class 3, the hash bit 0 may be generated. In a similar manner, a hash value of 2 bits may be generated after extracting the second speaker class and calculating r. This hash value may distinguish between the three given speakers. Although FIG. 7 illustrates an example in which the LDA technique is applied to three speakers, the same or similar technique may be applied even when there are four or more speakers.

FIGS. 8 to 12 are diagrams showing experimental results for speaker search results. In this example, the speaker search results were evaluated using the speaker voice datasets of Voxceleb 1 and 2. Voxceleb 1 and 2 may include automatically collected audio and video data for large scale speaker identification. For example, Voxceleb 1 and 2 may include 1,281,352 audio contents (e.g., utterances) from 7,365 speakers. Each audio content may be extracted from an audio or video clip, and each clip may include 10 to 50 audio contents.

Figure 8:
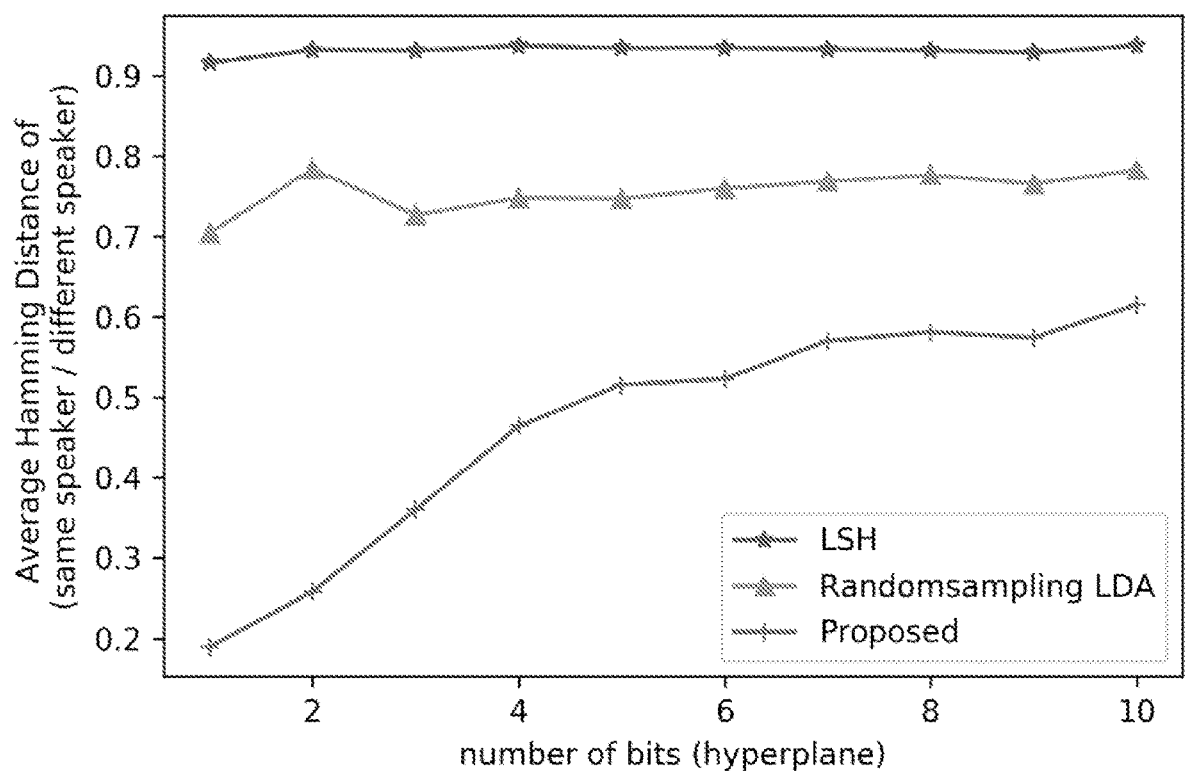
FIG. 8 is a diagram illustrating a graph showing result values according to the average Hamming distance of the same speaker and the average Hamming distance between different speakers, according to the LSH, the random sampling LDA method, and the proposed LDA method (LDA method using RSS).

FIG. 8 is a diagram illustrating a graph showing result values according to the average Hamming distance between the same speakers and the average Hamming distance between different speakers, according to LSH, the random sampling LDA method, and the proposed LDA method (LDA method using RSS) according to an embodiment. Here, the Hamming distance may approximate or approach the cosine distance as the number of hyperplanes k increases. The Hamming distance and the cosine distance may be expressed using Equation 4 below.

$$\cos(w_i, w_j) \approx \cos\left(\frac{H(h_r(w_i), h_r(w_j))}{k}\pi\right) \quad \text{[Equation 4]}$$

where, H(•) may represent the Hamming distance.

When the projection matrix effectively approximates the original distance, then the speaker representation for the same speaker, i.e., the speaker feature vector, is likely to be included in the same or near region (bin, bucket, and the like), and thus a small number of hash functions may be used to approximate the original distance. This may mean that the Hamming distance of the speaker representation for the same speaker is closer than the Hamming distance of the speaker representation for different speakers. Taking this into account, the approximate capability of a new projection matrix may be quantified by the average Hamming distance of the same speaker and different speakers.

FIG. 8 shows values obtained by dividing the average Hamming distance of the same speakers by the Hamming distance of different speakers, according to LSH, the random sampling LDA technique, and the proposed LDA technique (LDA technique using RSS). That is, in FIG. 8, the three techniques show whether the same speaker was perceived the same and how well the same speaker was distinguished from other speakers according to the number of bits in the hyperplane, and show a better performance of the speaker search when the value is lower. In FIG. 8, compared to the other two techniques, the result value of the proposed LDA technique indicates that the distance between the same speakers is close, but the different speakers result in far distance. That is, the voice search performance of the proposed LDA technique may be superior to the other two techniques.

Figure 9:
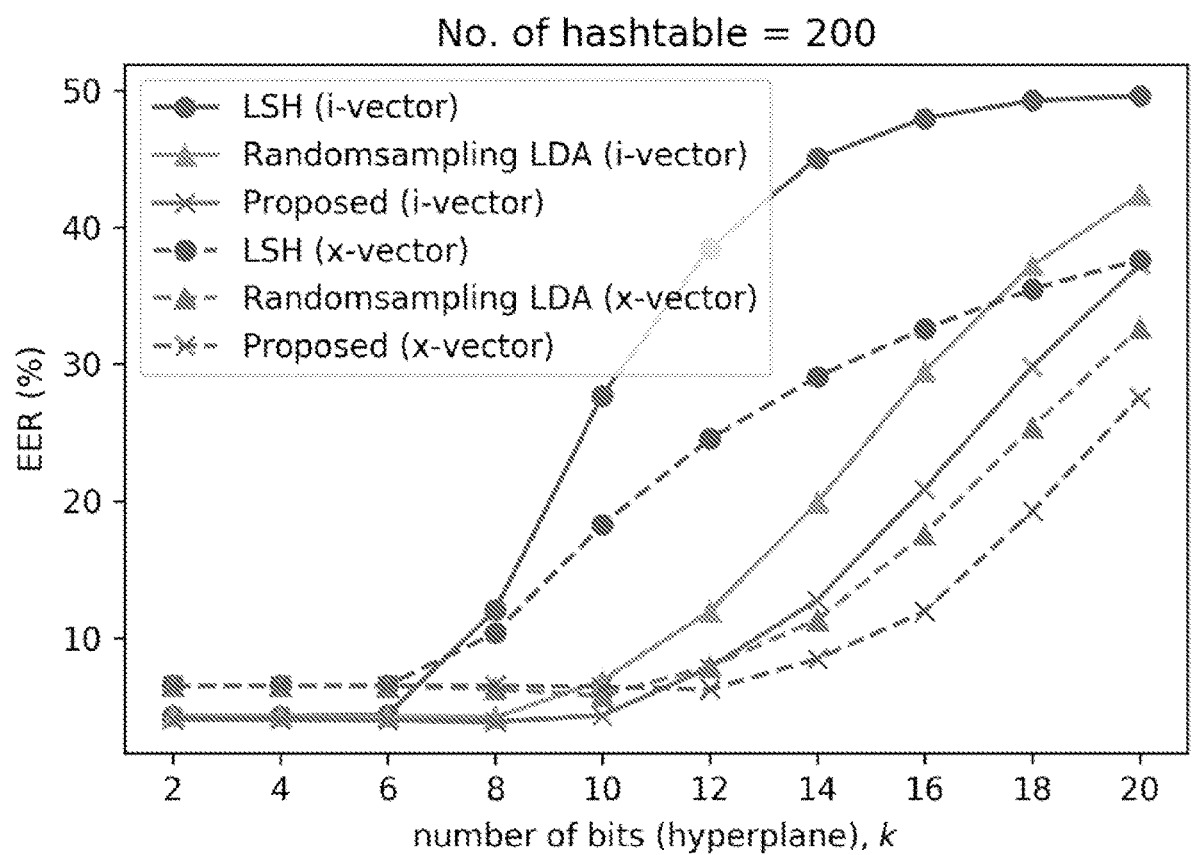
FIGS. 9 and 10 are diagrams illustrating graphs showing result values according to the number of hyperplanes and hash tables for various hash techniques.
Figure 10:
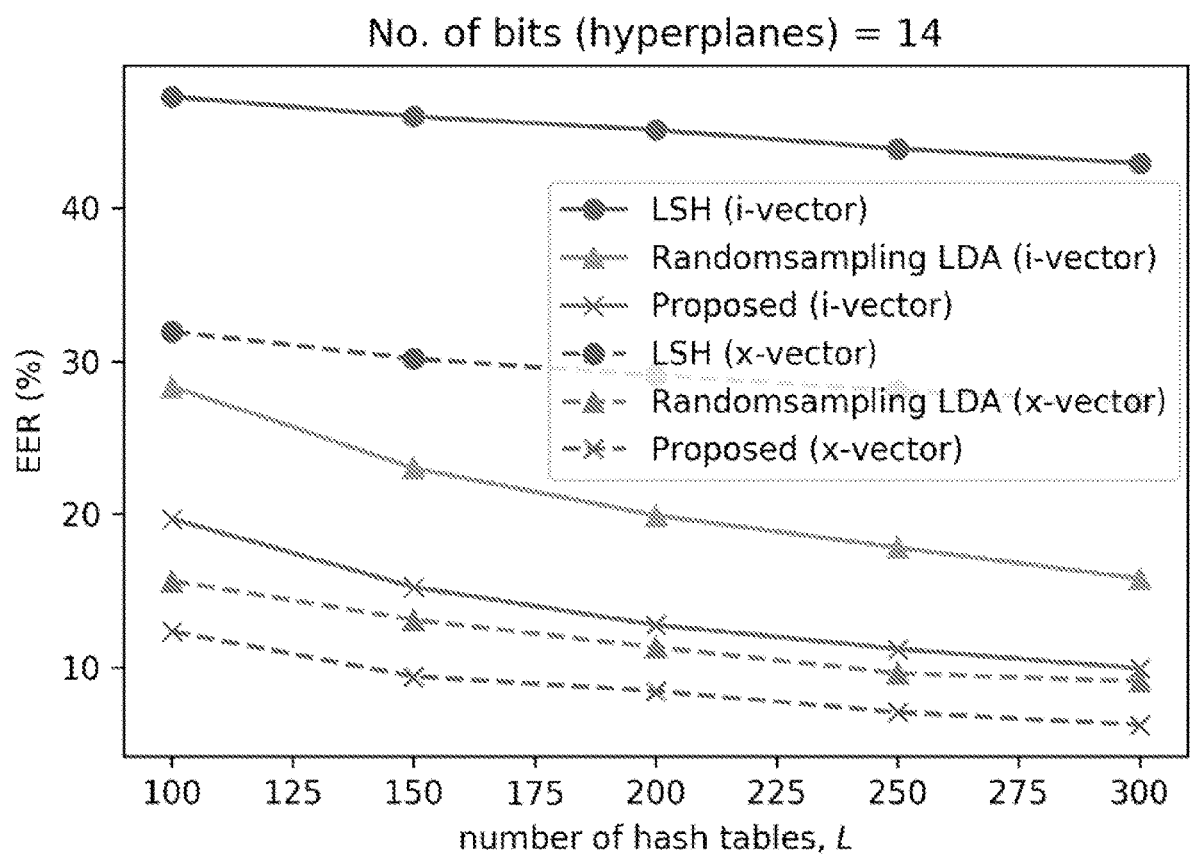

FIGS. 9 and 10 are diagrams illustrating graphs showing result values according to the number of hyperplanes and hash tables for various hash techniques. In this example, various hash techniques may include an LSH technique using i-vector, a random sampling LDA technique using i-vector, an RSS technique through LDA using i-vector, which is one of the proposed techniques, an LSH technique using an x-vector, a random sampling LDA technique using an x-vector, and an RSS technique through an LDA using an x-vector, which is one of the proposed techniques. FIGS. 9 and 10 show an Equal Error Rate (EER) according to the number of hyperplanes for each hash technique. As illustrated, it shows that the RSS technique through LDA using x-vector has the result value of the best ERR. That is, the RSS technique through LDA using x-vector shows better results than the RSS technique through LDA using i-vector. This may be attributed to the fact that in the i-vector framework, the i-vector was distributed in a Gaussian distribution, whereas the DNN for extracting the x-vector was more effectively trained using the one-hot speaker label. In view of these results, when the RSS technique through LDA is applied to the x-vector as well as the random speaker vector extracted from the DNN, the EER for the search for the same speaker may yield more improved result values.

Figure 11:
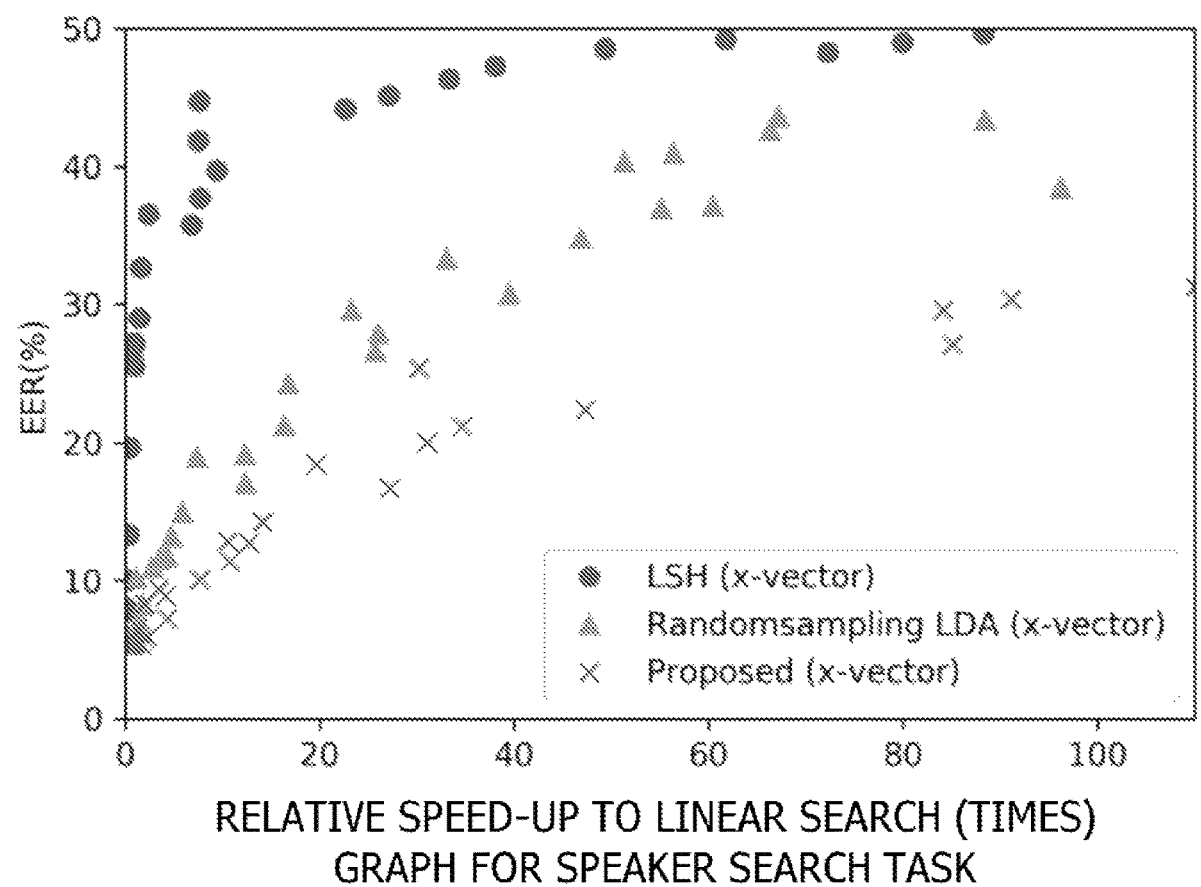
FIGS. 11 and 12 are diagrams illustrating graphs showing a trade-off between search speed and performance according to various hash techniques.
Figure 12:
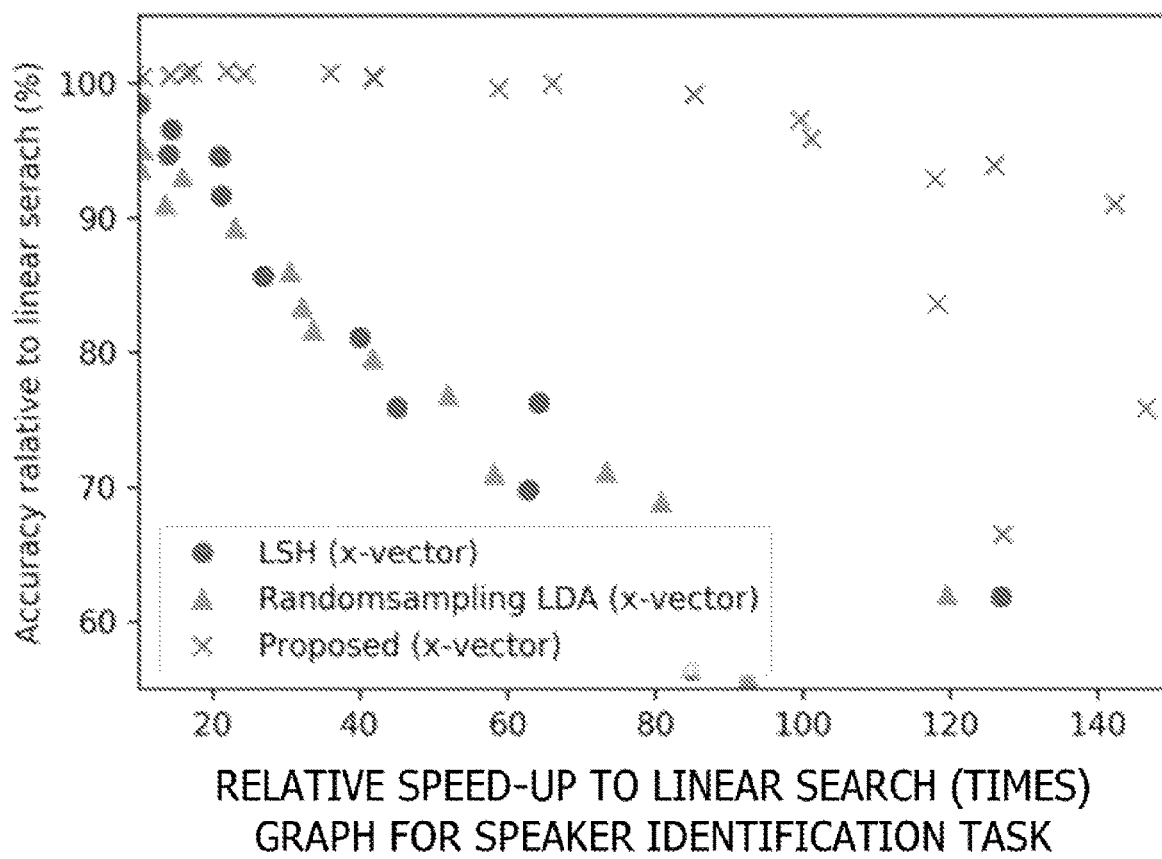

FIGS. 11 and 12 are diagrams illustrating graphs showing a trade-off between search speed and performance according to various hash techniques. This experiment was carried out by varying parameters k and L, and the results were scattered along the speed and performance axes. In speaker search and identification operation, the proposed technique (RSS technique through LDA using i-vector) shows a tremendous performance improvement over other techniques. For example, in improving the speed while maintaining the speaker identification performance of 95% or more compared to the speaker speech linear search, the proposed technique shows a speed improvement of about 100 times or more than that of the speaker search linear search, and achieves a speed improvement of 7 times or more than that of KSH. For reference, EER of FIGS. 9 to 11 is an absolute value, not a relative value to the linear search.

In general, a system and/or an apparatus for searching content having the same voice as the voice of the target speaker described herein may also represent various types of devices, such as wireless telephones, cellular telephones, laptop computers, wireless multimedia devices, wireless communication personal computer (PC) cards, PDAs, external modems, internal modems, devices in communication over a wireless channel, and the like. The device may have various names, such as access terminal (AT), access unit, subscriber unit, mobile station, mobile device, mobile unit, mobile phone, mobile, remote station, remote terminal, remote unit, user device, user equipment, handheld device, and the like. Any device described herein may have hardware, software, firmware, or combinations thereof as well as memory for storing instructions and data.

The techniques described herein may be implemented by various means. For example, these techniques may be implemented in hardware, firmware, software, or a combination thereof. Those skilled in the art will further appreciate that the various illustrative logical blocks, modules, circuits, and algorithm steps described in connection with the disclosure herein may be implemented in electronic hardware, computer software, or combinations of both. To clearly illustrate this interchangeability of hardware and software, various illustrative components, blocks, modules, circuits, and steps have been described above generally in terms of their functionality. Whether such a function is implemented as hardware or software varies depending on design constraints imposed on the particular application and the overall system. Those skilled in the art may implement the described functions in varying ways for each particular application, but such decisions for implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described herein, computer, or a combination thereof.

Accordingly, various example logic blocks, modules, and circuits described in connection with the disclosure herein may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any conventional processor, controller, microcontroller, or state machine. The processor may also be implemented as a combination of computing devices, for example, a DSP and microprocessor, a plurality of microprocessors, one or more microprocessors associated with a DSP core, or any other combination of such configurations.

In the implementation using firmware and/or software, the techniques may be implemented with instructions stored on a computer readable medium, such as random access memory (RAM), read-only memory (ROM), non-volatile random access memory (NVRAM), programmable read-only memory (PROM), erasable programmable read-only memory (EPROM), electrically erasable PROM (EPMROM), flash memory, compact disc (CD), magnetic or optical data storage devices, and the like. The instructions may be executable by one or more processors, and may cause the processor(s) to perform certain aspects of the functions described herein.

When implemented in software, the functions may be stored on a computer readable medium as one or more instructions or codes, or may be transmitted through a computer readable medium. The computer-readable media include both the computer storage media and the communication media including any medium that facilitates the transfer of a computer program from one place to another. The storage media may also be any available media that may be accessed by a computer. By way of non-limiting example, such a computer-readable medium may include RAM, ROM, EEPROM, CD-ROM or other optical disk storage, magnetic disk storage or other magnetic storage devices, or any other media that can be used to transfer or store desired program code in the form of instructions or data structures and can be accessed by a computer. Also, any connection is properly referred to as a computer-readable medium.

For example, when the software is transmitted from a website, server, or other remote sources using coaxial cable, fiber optic cable, twisted pair, digital subscriber line (DSL), or wireless technologies such as infrared, wireless, and microwave, the coaxial cable, the fiber optic cable, the twisted pair, the digital subscriber line, or the wireless technologies such as infrared, wireless, and microwave are included within the definition of the medium. The disks and the discs used herein include CDs, laser disks, optical disks, digital versatile discs (DVDs), floppy disks, and Blu-ray disks, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of storage medium known. An exemplary storage medium may be coupled to the processor, such that the processor may read or write information from or to the storage medium. Alternatively, the storage medium may be integrated into the processor. The processor and the storage medium may exist in the ASIC. The ASIC may exist in the user terminal. Alternatively, the processor and storage medium may exist as separate components in the user terminal.

The above description of the present disclosure is provided to enable those skilled in the art to make or use the present disclosure. Various modifications of the present disclosure will be readily apparent to those skilled in the art, and the general principles defined herein may be applied to various modifications without departing from the spirit or scope of the present disclosure. Accordingly, the present disclosure is not intended to be limited to the examples described herein, but is intended to be given the broadest scope consistent with the principles and novel features disclosed herein.

Although example implementations may refer to utilizing aspects of the presently disclosed subject matter in the context of one or more standalone computer systems, the subject matter is not so limited, and they may be implemented in conjunction with any computing environment, such as a network or distributed computing environment. Furthermore, aspects of the presently disclosed subject matter may be implemented in or across a plurality of processing chips or devices, and storage may be similarly influenced across a plurality of devices. Such devices may include PCs, network servers, and handheld devices.

Although the subject matter has been described in language specific to structural features and/or methodological acts, it will be understood that the subject matter defined in the appended claims is not necessarily limited to the specific features or acts described above. Rather, the specific features and acts described above are described as example forms of implementing the claims.

Although the method mentioned herein has been described through specific embodiments, it is possible to implement it as computer readable code on a computer readable recording medium. The computer readable recording medium includes all kinds of recording devices in which data readable by a computer system is stored. Examples of computer readable recording medium include ROM, RAM, CD-ROM, magnetic tape, floppy disks, and optical data storage devices, and the like. In addition, the computer readable recording medium may be distributed over network coupled computer systems so that the computer readable code is stored and executed in a distributed manner. Further, programmers in the technical field pertinent to the present disclosure will be easily able to envision functional programs, codes and code segments to implement the embodiments.

Although the present disclosure has been described in connection with some embodiments herein, it should be understood that various modifications and changes can be made without departing from the scope of the present disclosure, which can be understood by those skilled in the art to which the present invention pertains. Further, such modifications and changes are intended to fall within the scope of the claims appended herein.

What is claimed is:

1. A method for searching content including a voice of a same speaker as a target speaker, comprising:
   receiving a sound generated by the voice of the target speaker;
   extracting a feature representing the voice of the target speaker from the sound;
   calculating a hash value corresponding to the feature representing the voice of the target speaker using a hash function; and
   searching content associated with a similar hash value to the calculated hash value from among a plurality of contents searchable on a network,
   wherein the extracting the feature representing the voice of the target speaker from the sound includes extracting a speaker feature vector corresponding to the voice of the target speaker from the sound, and
   wherein the calculating the hash value corresponding to the feature representing the voice of the target speaker using the hash function includes:
      selecting a random subset of speakers from training voice data repeatedly by a predetermined number of times, wherein the random subset of speakers is associated with a plurality of speaker classes;
      generating a discriminative transform function based on the selected random subset of speakers, wherein the hash function is generated using the generated discriminative transform function; and
      inputting the extracted speaker feature vector into the hash function and calculating a hash value corresponding to the feature representing the voice of the target speaker.

2. The method according to claim 1, wherein the generating the discriminative transform function based on the selected random subset of speakers includes training an artificial neural network discrimination model such that regions corresponding to a plurality of speaker classes associated with the random subset of speakers are determined using the selected random subset of speakers.

3. The method according to claim 2, wherein the training the artificial neural network discrimination model includes training the artificial neural network discrimination model using the selected random subset of speakers so as to minimize a distance between features in one speaker class among the plurality of speaker classes associated with the selected random subset of speakers, and maximize a distance between features in the plurality of speaker classes.

4. The method according to claim 2, wherein the inputting the extracted speaker feature vector into the hash function and calculating a hash value corresponding to the feature representing the voice of the target speaker includes:
   inputting the extracted speaker feature vector into the trained artificial neural network discrimination model, and outputting information on a region for at least one speaker class corresponding to the extracted speaker feature vector from among a plurality of regions corresponding to the plurality of speaker classes; and
   generating a hash value corresponding to the feature representing the voice of the target speaker by using a value corresponding to each of the regions for the at least one speaker class.

5. The method according to claim 1, wherein the generating the discriminative transform function based on the selected random subset of speakers includes generating linear discriminant analysis (LDA) transformation matrices repeatedly by the predetermined number of times using each of the selected random subset of speakers.

6. The method according to claim 5, wherein the inputting the extracted speaker feature vector into the hash function and calculating a hash value corresponding to the feature representing the voice of the target speaker includes:
projecting, by using each of the generated LDA transformation matrices, the extracted speaker feature vectors to a random speaker-variability subspace corresponding to each of the generated LDA transformation matrices;
when each of projection regions of the extracted speaker feature vector belongs to one speaker class among a plurality of speaker classes associated with the random speaker-variability subspace, assigning a value corresponding to the one speaker class to each of the projection regions of the extracted speaker feature vector; and
generating a hash value corresponding to the extracted speaker feature vector based on the assigned values.

7. The method according to claim 5, wherein the generating the LDA transformation matrices repeatedly by the predetermined number of times using each of the selected random subset of speakers includes:
for each of the selected random subset of speakers,
generating a scatter matrix between a plurality of speaker classes associated with the random subset of speakers using the training voice data;
generating a scatter matrix within one speaker class associated with the random subset of speakers using the training voice data; and
generating the LDA transformation matrices such that a ratio of the scatter matrix between the plurality of speaker classes and the scatter matrix within the one speaker class is maximized.

8. The method according to claim 1, wherein the predetermined number includes a total number of predetermined hash tables.

9. A non-transitory computer readable storage medium recording a program including instructions for performing each of the steps according to the method according to claim 1.

* * * * *